United States Patent
Friggstad et al.

(10) Patent No.: US 7,849,932 B2
(45) Date of Patent: Dec. 14, 2010

(54) STEERING AND ELEVATING WHEEL SYSTEM FOR AGRICULTURAL IMPLEMENT

(75) Inventors: Terry Friggstad, Saskatchewan (CA); Dennis Thompson, Saskatchewan (CA)

(73) Assignee: CNH Canada, Ltd. (CA)

( * ) Notice: Subject to any disclaimer, the term of this patent is extended or adjusted under 35 U.S.C. 154(b) by 0 days.

(21) Appl. No.: 12/113,674

(22) Filed: May 1, 2008

(65) Prior Publication Data

US 2009/0273160 A1 Nov. 5, 2009

(51) Int. Cl.
A01B 69/00 (2006.01)
(52) U.S. Cl. .................. 172/278; 172/318; 172/321; 172/383
(58) Field of Classification Search .............. 172/278, 172/311, 321, 337, 383, 318
See application file for complete search history.

(56) References Cited

U.S. PATENT DOCUMENTS

| | | | |
|---|---|---|---|
| 2,780,158 A | 2/1957 | Pursche | |
| 2,982,363 A | 5/1961 | Sweet et al. | |
| 3,288,480 A | 11/1966 | Calkins et al. | |
| 3,648,780 A * | 3/1972 | Fueslein et al. | 172/319 |
| 4,043,403 A * | 8/1977 | Anderson et al. | 172/413 |
| 4,098,346 A | 7/1978 | Stanfill et al. | |
| 4,272,097 A * | 6/1981 | Cornelius | 172/311 |
| 4,282,935 A | 8/1981 | Dietrich | |
| 4,319,643 A * | 3/1982 | Carter et al. | 172/311 |
| 4,359,105 A | 11/1982 | Van Natta | |
| 4,487,267 A * | 12/1984 | Friggstad | 172/310 |
| 4,496,004 A * | 1/1985 | Frase et al. | 172/311 |
| 4,568,219 A * | 2/1986 | Berry | 404/118 |
| 4,944,355 A | 7/1990 | Karchewski | |
| 5,154,240 A | 10/1992 | Carrick | |
| 5,462,123 A * | 10/1995 | Harlan et al. | 172/454 |
| 5,787,988 A * | 8/1998 | Harlan et al. | 172/311 |
| 6,179,315 B1 | 1/2001 | Boriack | |

(Continued)

FOREIGN PATENT DOCUMENTS

FR 2751165 7/1997

OTHER PUBLICATIONS

Orthman Agricultural, Tracker IV Implement Guidance System Web Page, http://www.orthman.com/html603/tracker-IV.html, accessed Nov. 26, 2008.

(Continued)

Primary Examiner—Robert E Pezzuto
Assistant Examiner—Jamie L McGowan
(74) Attorney, Agent, or Firm—Rebecca Henkel

(57) ABSTRACT

An apparatus for facilitating steering, height adjustment and transport of a farm implement towed by a vehicle. The implement includes a main frame and a hitch that extends from the frame for linking to the vehicle. The apparatus comprises a wheel support member supported below the frame, at least a first ground engaging wheel supported by the wheel support member for rotation about a first wheel axis and to engage a ground surface below the frame thereby supporting the frame above the ground, a first hydraulic lift cylinder linked between the frame and the wheel support member and controllable to adjust the height of the frame above the ground, and a hydraulic steering cylinder mounted to the wheel support member and controllable to steer the first wheel independent of the state of the first lift cylinder.

2 Claims, 5 Drawing Sheets

U.S. PATENT DOCUMENTS

| | | |
|---|---|---|
| 6,553,299 B1 | 4/2003 | Keller et al. |
| 7,063,167 B1 * | 6/2006 | Staszak et al. ............. 172/328 |
| 7,147,241 B2 * | 12/2006 | Beaujot et al. ............. 280/442 |
| 2004/0094313 A1 * | 5/2004 | Myers ........................ 172/452 |
| 2007/0163791 A1 * | 7/2007 | Meek ........................ 172/311 |

OTHER PUBLICATIONS

Bill Strautman, "Rear Steer Keeps Seed Hawk On Steep Hills", Western Producer Newspaper, Apr. 1, 2004, p. 103, Saskatoon, CA.

Options-Rear Wheel Steering, Seed Hawk Product Literature.

* cited by examiner

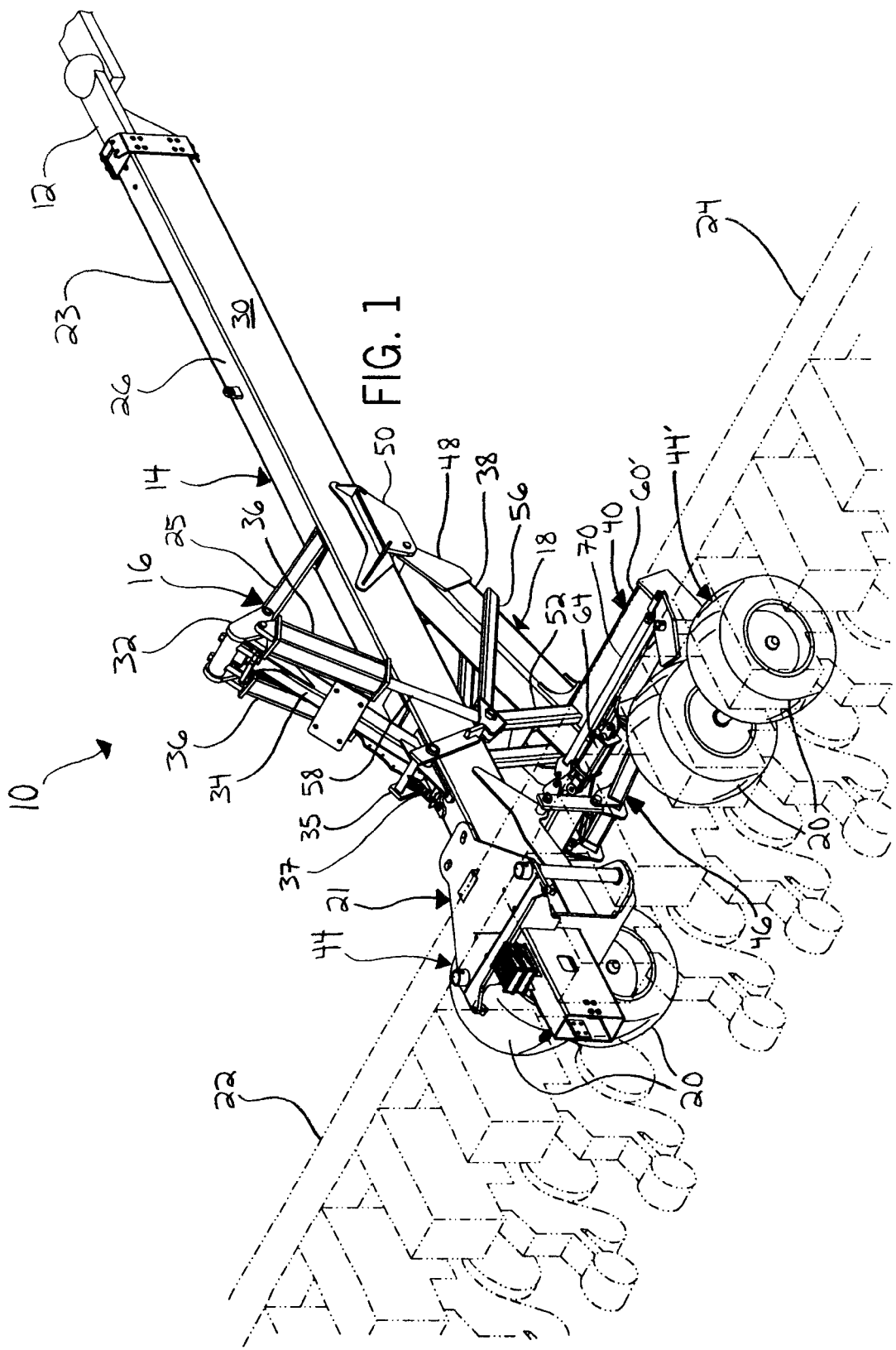

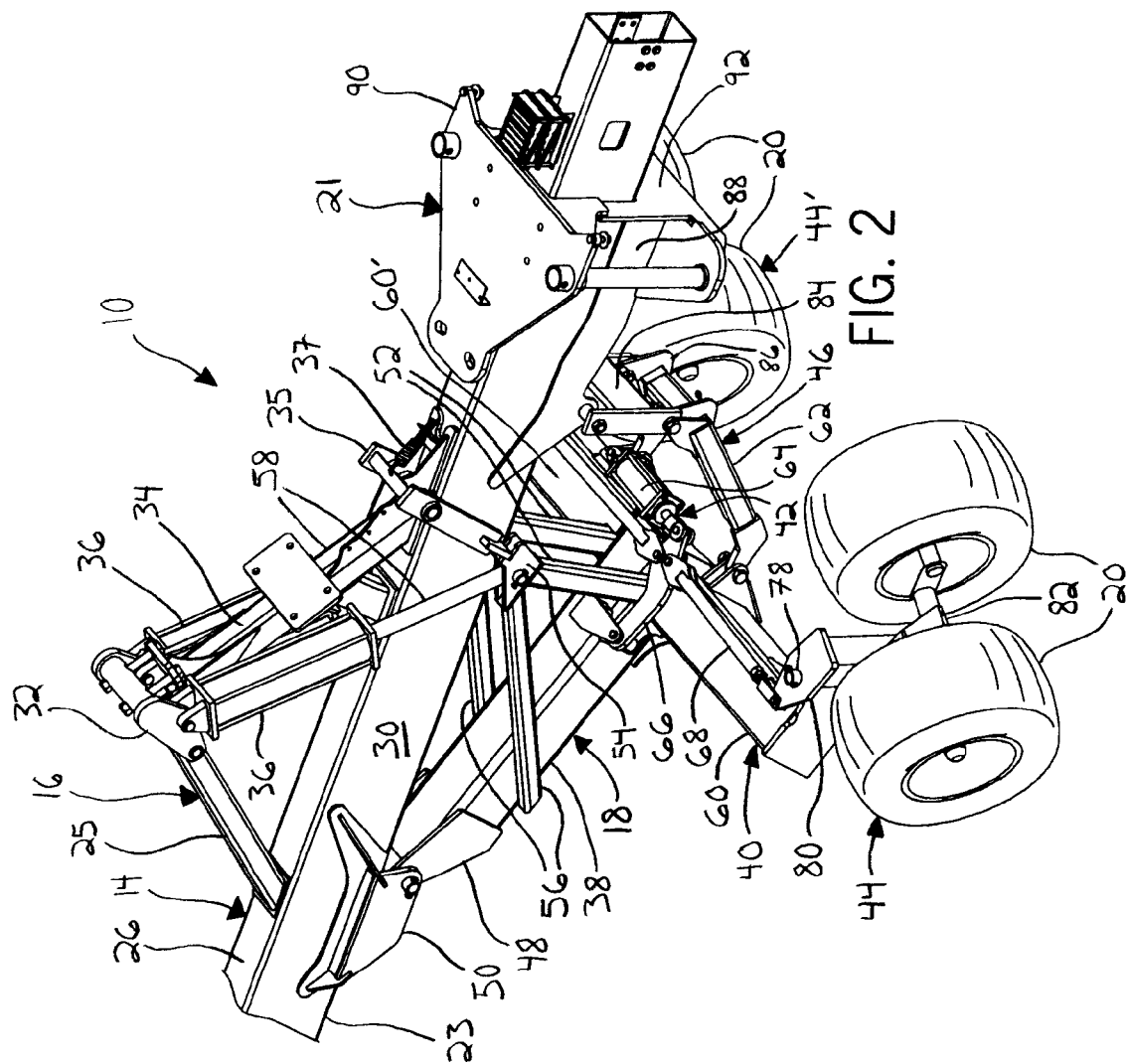

US 7,849,932 B2

STEERING AND ELEVATING WHEEL SYSTEM FOR AGRICULTURAL IMPLEMENT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to steering and lift mechanisms for agricultural implements and more specifically to an assembly that can be used to adjust the height of an implement main frame and to steer implement wheels.

Large agricultural planters typically include a central frame assembly that is supported by a plurality of ground engaging wheels, one or more long tool supporting booms or wing frame assemblies mounted to the central frame assembly and extending laterally there from to, as the label implies, support planter row units, and a hitch that extends in a forward direction from the frame to link the planter to a tractor or the like for transport. A typical row unit includes a disc or other ground engaging component for opening a seed trench of a certain depth in the ground as the planter is pulled through a field, a seed dispensing subassembly for dispersing seeds in a controlled fashion into the trench and, in many cases, other components for adjusting trench depth, seed dispersal rate, etc. Here, in some cases, the total length of the main frame and wing assemblies can be ninety feet or more so that wide swaths of a field can be planted during each pass there through.

While wide planters reduce the amount of time required to plant a field, planters with large widths make it difficult if not impossible to transport the planters to and from fields to be planted. For this reason wide planters have been designed that are typically reconfigurable to facilitate transport. For instance, in many cases wide planters have been designed with extendable hitches and with the long wing frame assemblies mounted to the central frame assembly to fold forward over a portion of the extended hitch prior to transport. In these cases the ground engaging wheels on the central frame assembly continue to support the central frame and folded wing frames for transport.

While row unit trenching discs and other row unit components have to contact or be very near ground surface level during a seeding activity, during transport row units have to be raised so that they clear ground surface level. To this end many planters have been designed that include systems for adjusting the height of wing frame assemblies above ground level so that row units can be positioned at various planting heights or a relatively high transport height.

In the case of folding wing planters where a hitch extends forward and wing assemblies fold forward over the hitch for transport, while planter width may be suitable for transport, the planter length is increased appreciably which can exacerbate the process of maneuvering the planter through turns. In this regard, when a planter hitch is extended and wing assemblies are folded into the transport position, the ground engaging wheels on the central frame assembly are far away from the end of the hitch linked to a tractor which means that the tractor/planter assembly has an extremely large turning radius in this configuration. A large turning radius can be particularly problematic when turning off a narrow road and through a narrow pass into a field or when maneuvering through other tight spots.

BRIEF SUMMARY OF THE INVENTION

It has been recognized that a combined steering/height adjustment assembly can be used to mount ground engaging wheels to a farm implement main/central frame assembly which can be used to both alter the height of the frame assembly and other components attached thereto above a ground level and to control steering of the ground engaging wheels to facilitate implement transport as well as steering when maneuvering through difficult turning activities. To this end, the present invention generally includes hydraulic cylinders for controlling wheel steering as well as frame height above ground. More specifically, the steering cylinder is mounted to a wheel support member and height adjust cylinders are linked between the frame assembly and the wheel support member. In this configuration, the steering cylinder only has to have enough force to change the direction of the wheels instead of having to alter the orientation of the entire wheel support member and height adjust cylinder assembly and therefore a relatively small steering cylinder is required.

At least some embodiments include a support assembly for facilitating steering, height adjustment and transport of a farm implement towed by a vehicle. The implement includes a main frame and a hitch that extends from the frame for linking to the vehicle. The assembly comprises a wheel support member supported below the frame, at least a first ground engaging wheel supported by the wheel support member for rotation about a first wheel axis and to engage a ground surface below the frame thereby supporting the frame above the ground, a first hydraulic lift cylinder linked between the frame and the wheel support member and controllable to adjust the height of the frame above the ground, and a hydraulic steering cylinder mounted to the wheel support member and controllable to steer the first wheel independent of the state of the first lift cylinder.

In some embodiments, the assembly includes at least a second ground engaging wheel supported by the wheel support member for rotation about a second wheel axis and to engage the ground surface below the frame thereby supporting the frame above the ground, and the first hydraulic steering cylinder is controllable to steer the second wheel independent of the state of the first hydraulic lift cylinder. In some embodiments, the wheel support member includes an elongated shoulder member including first and second oppositely directed ends where the first and second ground engaging wheels are mounted at the first and second ends of the shoulder member, respectively.

In some embodiments, the wheel support member includes an elongated neck member that includes first and second oppositely directed ends, the second end of the neck member is secured to the shoulder member between the first and second ends of the shoulder member, and the first end of the neck member is mounted to the frame for pivotal movement. In some embodiments, the first hydraulic lift cylinder is linked between the shoulder member and the frame.

In some embodiments, the wheel support members forms first and second wheel pivot channels, respectively, and the assembly further includes first and second wheel pivot assemblies. The first wheel pivot assembly includes a first pivot pin passing through the first wheel pivot channel and a first pivot arm that extends from and is substantially perpendicular to the first pivot pin. The second wheel pivot assembly includes a second pivot pin passing through the second wheel pivot channel and a second pivot arm that extends from and is substantially perpendicular to the second pivot pin. The steering cylinder is linked to distal ends of each of the first and second pivot arm members.

In some embodiments, the assembly includes an intermediate pivot member and first and second arm links. The intermediate pivot member is mounted to the wheel support member to pivot about an intermediate pivot axis, and the first and second arm links link the intermediate pivot member to each of the first and second pivot arms, respectively. A moveable end of the steering cylinder is linked to the intermediate pivot member such that when the steering cylinder is adjusted, distal ends of the first and second arm links move substantially in the same direction.

In some embodiments, the assembly includes a lift cylinder anchor member that extends above the frame, one end of the first hydraulic lift cylinder is linked to the lift cylinder anchor member and the other end of the first lift cylinder is linked to the wheel support member. In some embodiments, the frame includes a hitch boom having first and second lateral sides, and the assembly further includes a second hydraulic lift cylinder linked at one end to the lift cylinder anchor member and linked at the other end to the wheel support member, and the first and second lift cylinders are positioned on the first and second sides of the hitch boom, respectively.

In some embodiments, the steering cylinder resides below the frame. In some embodiments, the implement is a folding planter with foldable wing booms on either side of the frame. In some embodiments, the assembly includes a control terminal usable to alter the lengths of each of the hydraulic cylinders. In some embodiments, the control terminal is located within a cab of the vehicle.

At least some embodiments include an assembly for use with a farm implement towed by a vehicle. The implement includes a main frame and a hitch that extends from the frame for linking to the vehicle. The assembly comprises a T-shaped wheel support member including a neck member and two arm members, the neck member including first and second oppositely directed ends, the arm members extending from the second end of the neck member in substantially opposite directions, the first end of the neck member mounted to the frame for pivotal movement about a substantially horizontal axis, first and second ground engaging support wheels mounted at distal ends of the first and second arm members, respectively, an anchor member extending from the frame, a first hydraulic lift cylinder linked between the anchor member and the T-shaped support member proximate the arm members for adjusting a distance between the arm members and the frame, and a hydraulic steering cylinder mounted to the wheel support member below the frame and linked to the first and second support wheels for controlling steering of the wheels.

In some embodiments, the anchor member extends to a distal end on a side of the frame opposite the side on which the steering cylinder is mounted, and the first lift cylinder is linked to the distal end of the anchor member. In some embodiments, the assembly includes an elongated intermediate pivot member and first and second elongated links, the intermediate pivot member is mounted to the wheel support member for pivotal movement at a first end, and linked at a second end to the extendable end of the steering cylinder, the first elongated link is linked to a central portion of the intermediate pivot member at a first end and includes a second end that extends toward the first wheel, and the second elongated link is linked to a central portion of the intermediate pivot member at a first end and includes a second end that extends toward the second wheel.

At least some embodiments include a support assembly for facilitating steering, height adjustment and transport of a farm implement towed by a vehicle, and the implement includes a frame. The support assembly comprises a wheel support member linked to the frame to pivot about a first axis, a first hydraulic lift cylinder linked between the frame and the wheel support member, at least a first ground engaging wheel, a first wheel pivot assembly that links to the first ground engaging wheel and defines a first wheel axis of rotation for the first ground engaging wheel, the first wheel pivot assembly being linked to the wheel support member to pivot about a second axis, the second axis being substantially perpendicular to the first axis, and a steering cylinder connected to the wheel support member and linked to the first wheel pivot assembly.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

FIG. 1 is a perspective view of a farm implement including planter row units shown in a working position that is consistent with at least some aspects of the present invention;

FIG. 2 is a perspective partial view of the farm implement of FIG. 1;

DETAILED DESCRIPTION OF THE INVENTION

Figures 3, 4:
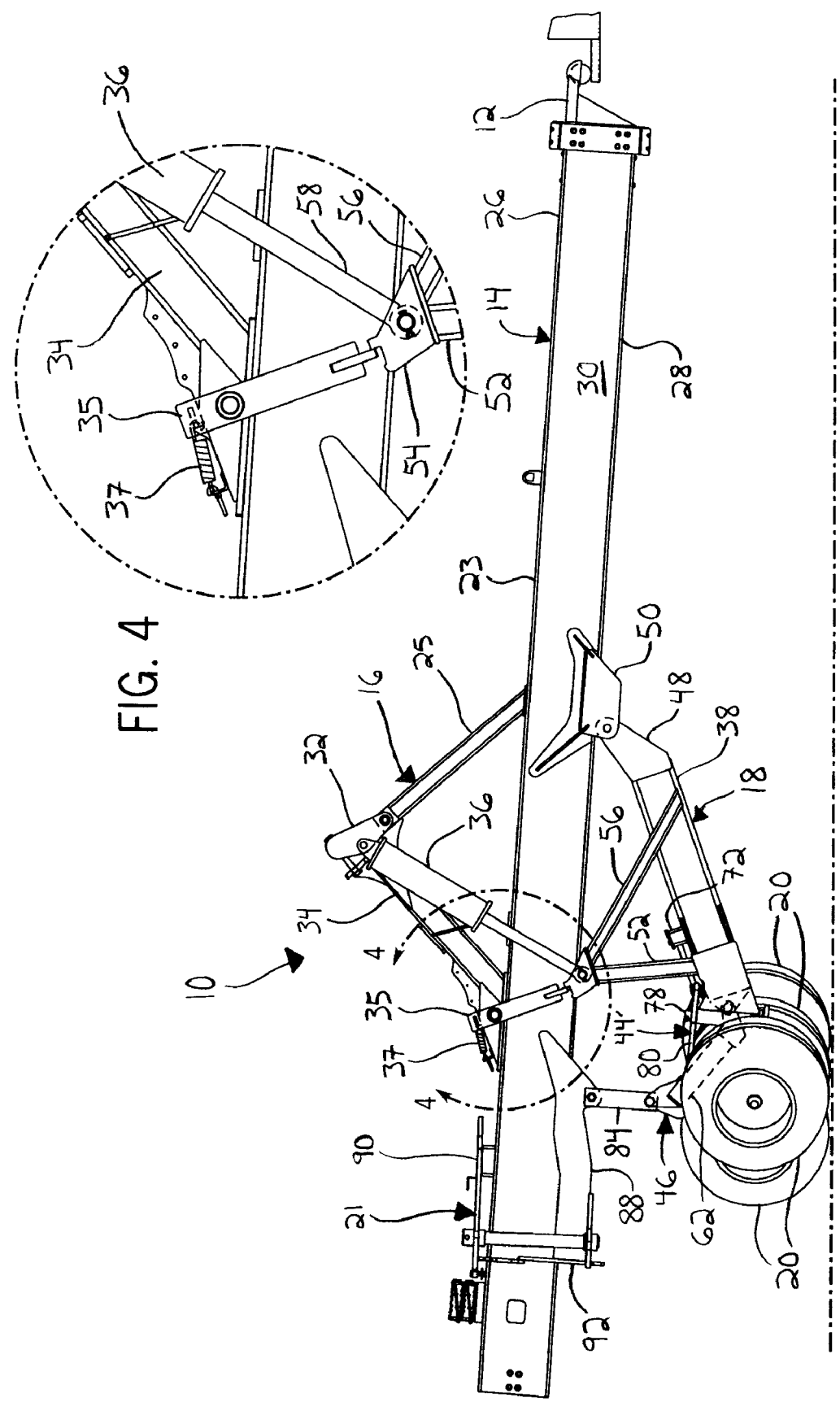
FIG. 3 is a side view of the farm implement of FIG. 1 in a transporting position of the implement.
FIG. 4 is a detail view of the area defined by line 4-4 in FIG. 3.

Referring now to the drawings wherein like reference numerals correspond to similar elements throughout the several views, and more specifically referring to FIGS. 1-6, the present invention will be described in the context of a work vehicle (not shown), such as a tractor, which is linked to a farm implement 10 by an extendable hitch 12. In this description, the word 'linked' should be understood as a connection between components in which the components can rotate relative to one another. In addition to the extendable hitch 12, the farm implement 10 includes a frame 14, a lift cylinder anchor member 16, hydraulic cylinders 36, a wheel support member 18, wheel pivot assemblies 44 and 44', a boom support member 21, and foldable wing booms 22 and 24. Referring to FIG. 1, the foldable wing booms 22 and 24 are shown in dashed lines and may include various types of components that are well known in the art. For example, the foldable wing booms 22 and 24 may include seed planting units. The foldable wing booms 22 and 24 each link to the boom support member 21 to rotate about generally vertical axes to fold forward near the frame 14. The extendable hitch 12 is provided to increase the distance between the work vehicle and the locations at which the wing booms 22 and 24 pivot so that, when folded forward, the booms can be accommodated between the pivot locations and the work vehicle. Thus, when the wing booms 22 and 24 are folded, the booms do not contact the work vehicle.

Referring to FIGS. 1-6, the frame 14 includes a hitch boom 23 and a hitch boom bracket 50. The hitch boom 23, in some embodiments, is an elongated hollow member with a generally rectangular cross section. The hitch boom 23 includes an upper surface 26, a lower surface 28, and lateral sides 30. The hitch boom bracket 50 includes generally flat sections that connect to the hitch boom 23, and in some embodiments, more specifically, the lateral sides 30 of the hitch boom 23.

Referring to FIGS. 1-3 and 6, the anchor member 16 includes a first support member 25, a cylinder attachment bracket 32, a second support member 34, a locking member 35, and a spring 37. The anchor member 16 is generally positioned above the hitch boom 23. The first support member 25 has a generally rectangular cross section. The first support member 25 extends rearward and above the frame 14 from a first end that connects to the upper surface 26 of the hitch boom 23. The cylinder attachment bracket 32 connects to a distal end of the first support member 25. The second support member 34 is similar in structure to the first support member 25. Unlike the first support member 25, the second support member 34 extends forward and above the frame 14 from an end that connects to the upper surface 26 of the hitch boom 23. A distal end of the second support member 25 connects to the cylinder attachment bracket 32. The locking member 35 is a generally U-shaped member with sections near the upper surface 26 and the lateral sides 30 of the hitch boom 23. The locking member 35 is linked to the end of the second support member 34 proximate the hitch boom 23. The spring 37 biases the locking member 35 towards the configuration shown in FIGS. 3 and 4. The function of the locking member 35 and the spring 37 will be discussed in further detail below.

Referring to FIGS. 3-6, each of the hydraulic cylinders 36 includes an extending rod 58. The hydraulic cylinders 36 are linked to the cylinder attachment bracket 32 and extend rearward and downward therefrom. A single hydraulic cylinder 36 is positioned on each lateral side 30 of the hitch boom 23. The function of the hydraulic cylinders 36 will be discussed in further detail below.

Referring to FIGS. 1-8, and as most clearly shown in FIG. 2, the wheel support member 18 includes an elongated neck member 38, an elongated shoulder member 40, brackets 48 and 72, two distal connection members 52, two cylinder rod brackets 54, two intermediate connection members 56, a steering assembly 42, and a linkage assembly 46. The wheel support member 18 is generally positioned below the hitch boom 23. In some embodiments, the elongated neck member 38 has a generally rectangular cross section and may be hollow. The elongated neck member 38 extends downward and rearward from a first end proximate the hitch boom 23. The bracket 48 connects to the end of the elongated neck member 38 proximate the hitch boom 23. The bracket 48 is linked to the hitch boom bracket 50 for pivotal movement of the wheel support member 18 about a generally horizontal axis below the hitch boom 23. The bracket 72 connects to the elongated neck member 38 at a position near the distal end of the elongated neck member 38.

Figure 8:
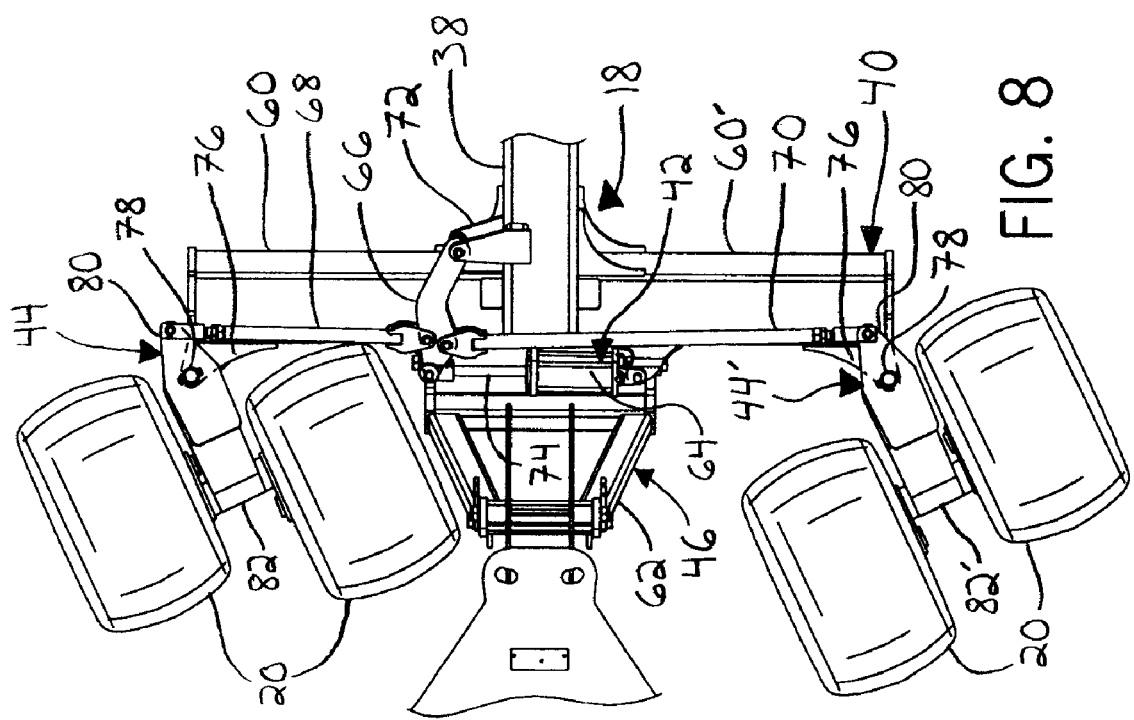
FIG. 8 is a top view of a wheel support member of FIG. 7 with wheel assemblies rotated for a right turn of the implement.
Figure 7:
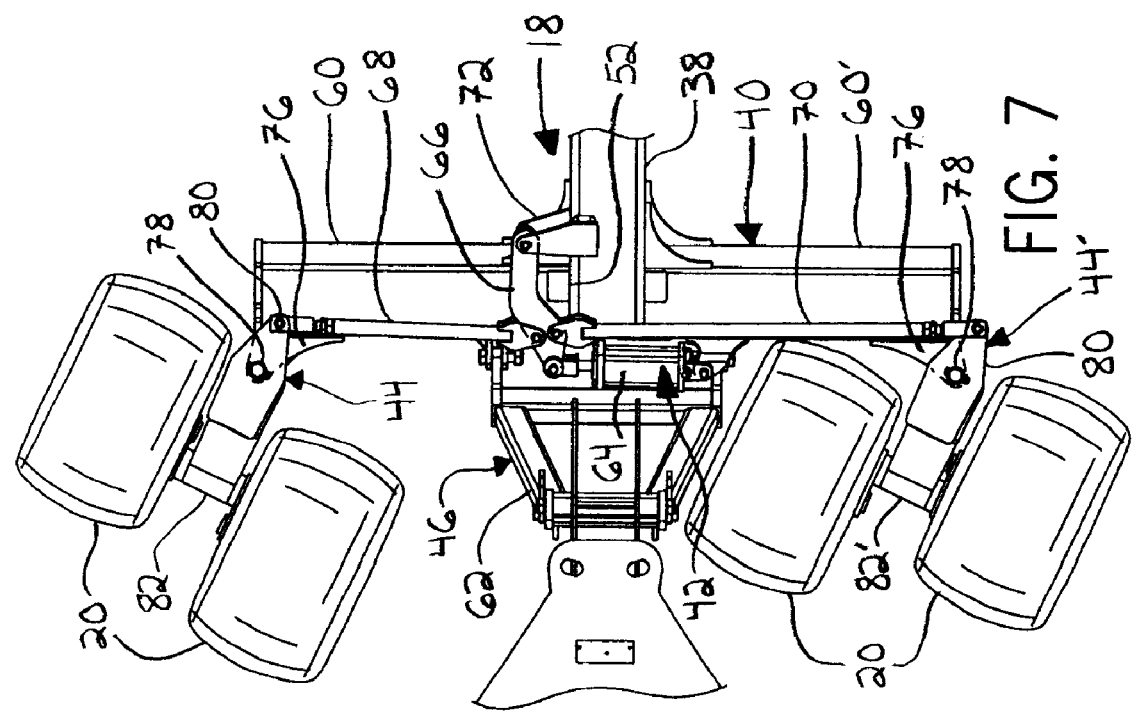
FIG. 7 is a top view of a wheel support member of the farm implement with wheel assemblies rotated for a left turn of the implement.

Referring to FIGS. 7 and 8, the elongated shoulder member 40 of the wheel support member 18 includes two arm members 60 and 60' and two brackets 76, one of which is connected to each of the arm members. The arm members 60 and 60' extend in generally opposite directions from a position in which the shoulder member 40 rigidly connects to the distal end of the elongated neck member 38. The arm members 60 and 60' are mirror images of one another, but are otherwise substantially similar components. Therefore, only the arm member 60 will be described here in detail. The arm member 60 may have a generally rectangular cross section and may be hollow. The bracket 76 forms a wheel pivot channel (not shown) and connects to the end of the arm member 60 opposite the distal end of the neck member 38.

Referring to FIG. 2 and as briefly described above, the wheel support member 18 includes, among other components, two distal connection members 52, two cylinder rod brackets 54, and two intermediate connection members 56. The distal connection members 52 are substantially similar components. The same also applies to the cylinder rod brackets 54 and the intermediate connection members 56. Therefore, only components on the left side of the farm implement 10 (the visible side as viewed in FIG. 2) will be described here in detail.

The distal connection member 52 may have a generally rectangular cross section and may be hollow. The distal connection member 52 connects to the distal end of the elongated neck member 38 and extends in a generally vertical direction there above. As most clearly shown in FIGS. 4 and 5, the cylinder rod bracket 54 is a generally trapezoidal-shaped bracket. The cylinder rod bracket 54 rigidly connects to the distal connection member 52, is linked to the extending rod 58 of the hydraulic cylinder 36, and can engage the locking member 35. The function of cylinder rod brackets 54 in connection with the locking member 35 will be discussed in further detail below. The intermediate connection member 56 may have a generally rectangular cross section and may be hollow. The intermediate connection member 56 rigidly connects to a center portion of the elongated neck member 38 and extends in a generally rearward and upward direction there above. The intermediate connection member 56 also rigidly connects to the cylinder rod bracket 54.

Referring to FIGS. 7 and 8, the steering assembly 42 of the wheel support member 18 includes a hydraulic steering cylinder 64, an intermediate pivot member 66, and first and second elongated links 68 and 70. The hydraulic steering cylinder 64 includes an extendable rod 74 and is linked to the rear surface of the arm member 60'. The intermediate pivot member 66 includes first and second ends and a central portion. In some embodiments, the intermediate pivot member 66 is generally flat and is shaped so that the intermediate pivot member 66 does not contact the distal connection member 52, as most clearly shown in FIG. 7. The first end of the intermediate pivot member 66 is linked to the bracket 72 connected to the elongated neck member 38. The second end of the intermediate pivot member 66 is linked to the extendable rod 74 of the hydraulic steering cylinder 64. In some embodiments, the first and second elongated links 68 and 70 are generally identical rod-like members, except the first link 68 is shorter than the second link 70. Therefore, only the first link 68 will be described here in detail. A first end of the first elongated link 68 is linked to the central portion of the intermediate pivot member 66. A second end of the first elongated link 68 extends generally in the direction of the arm member 60.

Referring to FIGS. 2, 7, and 8 and as briefly discussed above, the wheel support member 18 includes, among other components, a linkage assembly 46. The linkage assembly includes a first link 62, a second link 84, and an intermediate member 86. As most clearly shown in FIGS. 7 and 8, the first link 62 is generally trapezoidal and tapers from an end that links to the arm members 60 and 60' to a distal end. As most clearly shown in FIG. 2, the second link 84 is generally H-shaped and includes two generally flat side sections connected by an intermediate section. A first end of the second link 84 pivotally connects to the distal end of the first link 62, and a second end of the second link 84 generally extends towards the hitch boom 23. The intermediate member 86 is fixed to the second link 84 and engages the first link 62 as shown in FIG. 2. The intermediate member 86 permits part of the weight of the farm implement 10 to be supported through the linkage assembly 46.

Referring to FIGS. 7 and 8, the wheel pivot assemblies 44 and 44' are mirror images of one another, but are otherwise substantially similar assemblies. Therefore, only the wheel pivot assembly 44 will be described here in detail. The wheel pivot assembly 44 includes two ground engaging wheels 20, a pin 78, a pivot arm 80, and a wheel bracket 82. The wheel pivot assembly 44 is connected to the wheel support member 18 by the pin 78 that passes through the wheel pivot channel (not shown) of the bracket 76. The pivot arm 80 extends from the pin 78 and defines a surface that is generally perpendicular to the longitudinal axis of the pin 78. A distal end of the pivot arm 80 is linked to the second end of the first elongated link 68. The wheel bracket 82 connects to the pivot arm 80. The wheel bracket 82 also defines an axis of rotation for, and rotatably connects to, the two wheels 20. In at least some embodiments, the two wheels 20 rotatably connected to the wheel bracket 82 are offset from one another in the travel direction of the farm implement.

Figures 5, 6:
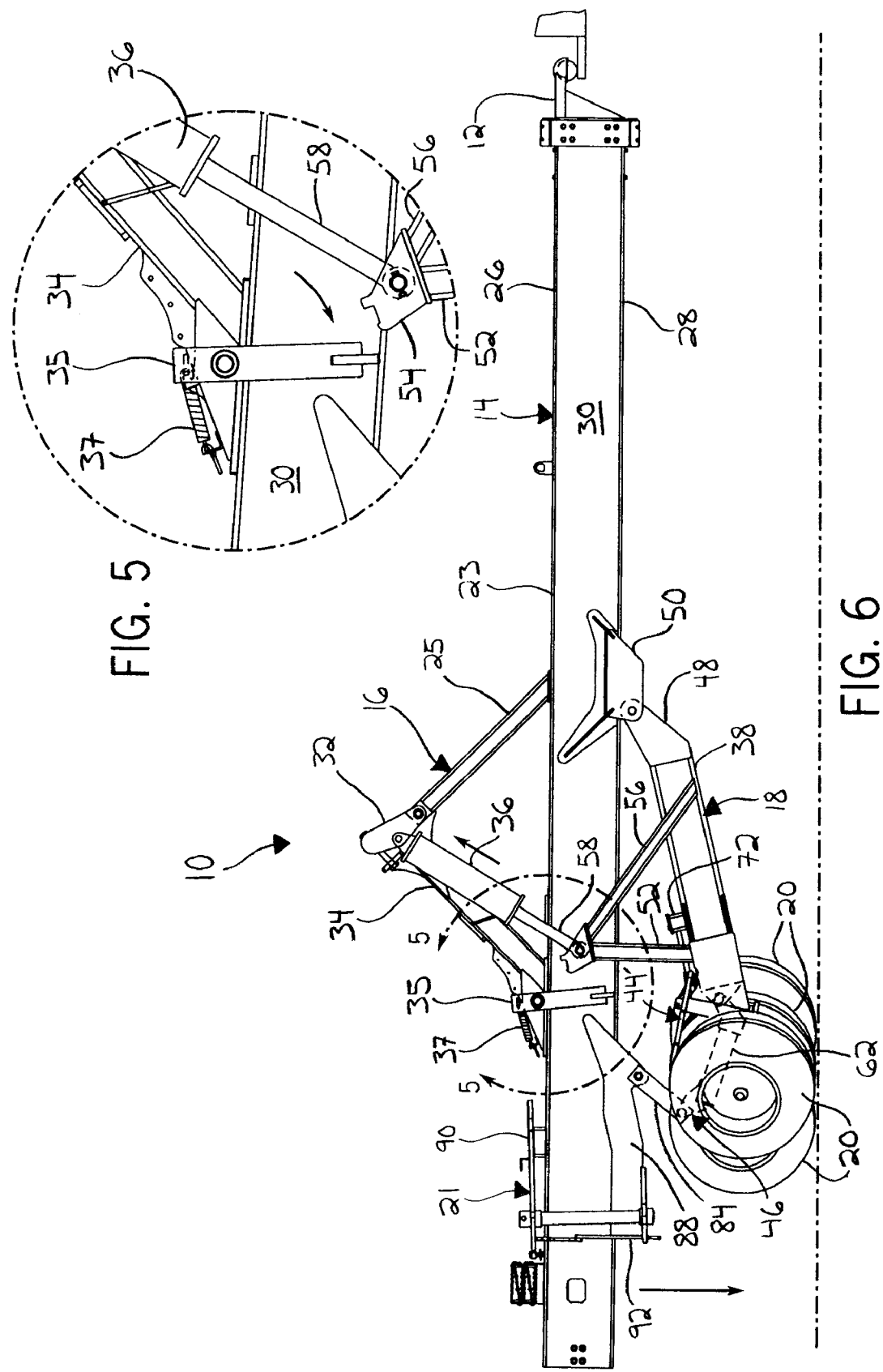
FIG. 5 is a detail view of the area defined by line 5-5 in FIG. 6.
FIG. 6 is a side view of the farm implement of FIG. 1 in a working position of the implement.

Referring to FIGS. 3 and 6, boom support member 21 includes elongated members 88, an upper member 90, and a lower member 92. The upper member 90 is fixed to the upper surface 26 of the hitch boom 23. The lower member 92 is positioned below the lower surface 28 of the hitch boom 23 and is fixed to the upper member 90. The elongated members 88 are fixed to the lower member 92 and link to the second end of the second link 84. As discussed above, the boom support member 21 links the foldable wing booms 22 and 24 to the frame 14.

As shown in FIGS. 3 and 6, the farm implement 10 can be positioned in different positions that are appropriate for transporting the farm implement 10 and moving components of the farm implement 10 into a working position. The farm implement 10 moves between the transport and working positions by actuating the hydraulic cylinders 36. Referring to FIG. 6, the hitch boom 23 is positioned in a relatively low working position when the extending rods 58 of the hydraulic cylinders 36 are retracted. The working position is suitable for permitting the seed planting units or other components attached to the foldable wing booms 22 and 24 to engage the ground or enter an otherwise appropriate working position. Referring to FIG. 3, the hitch boom 23 is elevated further above the ground when the extending rods 58 of the hydraulic cylinders 36 are extended. Extending the rods 58 causes the hitch boom 23 to rotate clockwise slightly as viewed from FIG. 3. Similarly, the first link 62 of the linkage assembly 46 rotates clockwise slightly, and the elongated neck member 38 and the second link 84 rotate counter-clockwise slightly when the rods 58 are extended. The elevated position is suitable for elevating components attached to the foldable wing booms 22 and 24 above the ground and transporting the farm implement 10 on a surface other than a field, such as a road. In addition, the elevated position is also a position in which the foldable wing booms 22 and 24 may be folded toward the frame 14 as discussed above.

Referring to FIGS. 3-6, in some embodiments of the present invention, the cylinder rod brackets 54 engage the locking member 35 when the farm implement is in the elevated/transport position. In some embodiments of the present invention, the locking member 35 must be moved in a clockwise direction, as shown in FIG. 5, to permit the hydraulic cylinders 36 to retract and thereby lower the farm implement 10. The locking member 35 may be rotated by any suitable actuating mechanism, such as a cable that pulls the top section of the locking member 35 and extends toward the work vehicle.

In some embodiments of the present invention, the locking member 35 engages the cylinder rod brackets 54 in a manner such that part of the weight of the farm implement 10 is supported through the locking member 35 and the cylinder rod brackets 54 during transport. Therefore, the hydraulic cylinders 36 do not solely support the weight of farm implement 10 in the elevated/transport position. However, the hydraulic cylinders 36 must be extended slightly to disengage the locking member 35 from the cylinder rod brackets 54 before the farm implement 10 is lowered.

As discussed above, maneuvering of a farm implement can be difficult when the distance between a work vehicle and the steering wheels of the implement is large. The steering assembly 42 is provided to assist in turning the farm implement 10. Actuation of the hydraulic steering cylinder 64 results in substantially similar motion of the wheel pivot assemblies 44 and 44'. Therefore, only motion of the wheel pivot assembly 44 will be described here in detail. Referring to FIG. 7, retracting the rod 74 of the hydraulic steering cylinder 64 causes the first elongated link 68 to move such that the wheel pivot assembly 44 rotates in a clockwise direction (as viewed from above farm implement 10). Rotation of the wheel pivot assembly 44 in a clockwise direction leads to a left turn if the farm implement is traveling forward. Referring to FIG. 8, extending the rod 74 of the hydraulic steering cylinder 64 causes the first elongated link 68 to move such that the wheel pivot assembly 44 rotates in a counter-clockwise direction. Rotation of the wheel pivot assembly 44 in a counter-clockwise direction leads to a right turn if the farm implement 10 is traveling forward. Operation of the steering assembly 42 advantageously reduces the turning radius of the farm implement 10. Therefore, the farm implement 10 can be maneuvered through narrow areas.

Those skilled in the art will recognize that additional components are needed in conjunction with the hydraulic cylinders 36 and the hydraulic steering cylinder 64, such as a pump (not shown) and hydraulic conduits (not shown). Any appropriate pump and conduits may be used, provided the pump meets the output requirements to lift and turn the appropriate components of the farm implement 10. In addition, in at least some embodiments, the hydraulic components are provided such that the hydraulic cylinders 36 may be actuated independently of the hydraulic steering cylinder 64.

In addition, in at least some embodiments, a control terminal (not shown) is provided to control the hydraulic cylinders 36 and 64. In at least some embodiments, the control terminal is inside a cab (not shown) of the work vehicle.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. An assembly for use with a farm implement towed by a vehicle, the implement including a main frame and a hitch that extends from the frame for linking to the vehicle, the assembly comprising:
   a T-shaped wheel support member including a neck member extending along an axis and two arm members, the neck member including first and second oppositely directed ends, the arm members extending from the second end of the neck member in substantially opposite directions, the first end of the neck member mounted to the frame for pivotal movement about a substantially horizontal axis;
   first and second ground engaging support wheels mounted at distal ends of the first and second arm members, respectively;
   an anchor member extending from the frame;
   a first hydraulic lift cylinder linked between the anchor member and the T-shaped support member proximate the arm members for adjusting a distance between the arm members and the frame;
   a hydraulic steering cylinder mounted to the wheel support member below the frame and linked to the first and second support wheels for controlling steering of the wheels, the steering cylinder including a piston terminating at a terminal end and being movable between an extended position and a retracted position;
   an elongated intermediate pivot member having first and second opposite ends and a central portion therebetween, the first end pivotably connected to the wheel support member;
   a first elongated link having a first end pivotably connected to the central portion of the pivot member and a second end operatively connected to the first wheel; and
   a second elongated link having a first end pivotably connected to the central portion of the pivot member and a second end operatively connected to the second wheel;
   wherein:
      the terminal end of the piston of the steering cylinder is pivotably connected to the second end of the pivot member such that the first and second wheels point towards a first side of the axis of neck member with the piston in the extended position and such that the first and second wheels point towards a second side of the axis of neck member with the piston in the retracted position;
      the anchor member extends to a distal end on a side of the frame opposite the side on which the steering cylinder is mounted and wherein the first lift cylinder is linked to the distal end of the anchor member; and
   said assembly having actuation during transport steers rear of the implement independent of said vehicle to facilitate entry to or egress from confining roadways or approaches.

2. A support assembly for facilitating steering, height adjustment and transport of a farm implement towed by a vehicle, the implement including a frame, the support assembly comprising:
   a wheel support member having first and second sides and linked to the frame to pivot about a first axis;
   a first hydraulic lift cylinder linked between the frame and the wheel support member;
   first and second ground engaging wheels;
   a first wheel pivot assembly having a first end linked to the first ground engaging wheel, an opposite second end and defining a first wheel axis of rotation for the first ground engaging wheel;
   a second wheel pivot assembly having a first end linked to the second ground engaging wheel, an opposite second end and defining a second wheel axis of rotation for the second ground engaging wheel;
   an elongated pivot member having first and second opposite ends and a central portion therebetween, the first end pivotably connected to the wheel support member and the central portion being connected to the second ends of the first and second wheel pivot assemblies;
   a steering cylinder connected to the wheel support member, the steering cylinder including a piston terminating at a terminal end pivotably connected to the second end of the pivot member and being movable between an extended position and a retracted position; and
   wherein:
      the frame includes a hitch boom having a top surface, a bottom surface, and first and second lateral sides;
      the first and second ground engaging wheels point towards a first side of the wheel support member with the piston in the extended position and such that the first and second ground engaging wheels point towards a second side of the wheel support member with the piston in the retracted position;
      movement of the piston of the steering cylinder between the extend and retracted positions during transport steers of the farm implement independent of said vehicle to facilitate entry to or egress from confining roadways or approaches.

* * * * *